United States Patent
Boulais et al.

(10) Patent No.: US 10,852,475 B2
(45) Date of Patent: Dec. 1, 2020

(54) FLEXIBLE LIGHT GUIDE FILM FOR ELECTRONIC ACTIVATION AND CONTROL

(71) Applicants: Kevin A. Boulais, La Plata, MD (US); Michael H. Fugate, Fredericksburg, VA (US); Simin Feng, Waldorf, MD (US); Walter D. Sessions, Marietta, GA (US); Robert B. Nichols, Yorktown, VA (US); Victor H. Gehman, Jr., Dahlgren, VA (US)

(72) Inventors: Kevin A. Boulais, La Plata, MD (US); Michael H. Fugate, Fredericksburg, VA (US); Simin Feng, Waldorf, MD (US); Walter D. Sessions, Marietta, GA (US); Robert B. Nichols, Yorktown, VA (US); Victor H. Gehman, Jr., Dahlgren, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 288 days.

(21) Appl. No.: 15/239,828

(22) Filed: Aug. 18, 2016

(65) Prior Publication Data

US 2018/0203189 A1    Jul. 19, 2018

Related U.S. Application Data

(60) Provisional application No. 62/206,969, filed on Aug. 19, 2015.

(51) Int. Cl.
G02B 6/12 (2006.01)
G02B 6/42 (2006.01)
G02B 6/43 (2006.01)

(52) U.S. Cl.
CPC ....... *G02B 6/12004* (2013.01); *G02B 6/4214* (2013.01); *G02B 6/43* (2013.01); *G02B 2006/12109* (2013.01); *G02B 2006/12138* (2013.01)

(58) Field of Classification Search
CPC .. G02B 6/0055; G02B 6/0088; G02B 6/0051; G02B 6/0083; G02B 6/00; G02B 6/0081; G02B 6/02052; G02B 27/0101; G02B 27/0172; G02B 27/0176; G02B 2027/0187; G02B 26/023
See application file for complete search history.

(56) References Cited

U.S. PATENT DOCUMENTS 1,306,064 A * 6/1919 Joy ................. B65G 65/00
                                              100/142
2,886,911 A * 5/1959 Hardesty ............ G09F 13/18
                                              116/DIG. 36

(Continued)

*Primary Examiner* — Thomas A Hollweg
*Assistant Examiner* — Mary A El Shammaa
(74) *Attorney, Agent, or Firm* — Gerhard W. Thielman

(57) ABSTRACT

A light transmission system is provided for operating an optically responsive circuit. The system includes a light guide film (LGF) to transmit light emitted from its edge, and a scattering node for directing the light to the circuit. The circuit is disposed on a proximate face of the LGF. The scattering node is disposed on a distal face of the LGF opposite the circuit. The circuit can be an integrated circuit, a light detection sensor or a photovoltaic cell.

7 Claims, 2 Drawing Sheets

(56) References Cited

U.S. PATENT DOCUMENTS

| | | | | |
|---|---|---|---|---|
| 4,477,725 A * | 10/1984 | Asawa | G01L 1/245 | 250/227.16 |
| 6,687,523 B1 * | 2/2004 | Jayaramen | A41D 13/1281 | 600/388 |
| 9,839,117 B2 * | 12/2017 | Codd | H05K 1/0216 | |
| 9,841,330 B2 * | 12/2017 | Casillas | A61B 5/6804 | |
| 9,933,818 B2 * | 4/2018 | Vacas Jacques | G06F 1/163 | |
| 2004/0109629 A1 * | 6/2004 | Kondo | G02B 6/12004 | 385/14 |
| 2006/0233485 A1 * | 10/2006 | Allen | F17D 5/00 | 385/13 |
| 2008/0170173 A1 * | 7/2008 | Park | G02F 1/133621 | 349/62 |
| 2008/0284925 A1 * | 11/2008 | Han | G06F 3/0425 | 349/12 |
| 2009/0243985 A1 * | 10/2009 | Park | G02F 1/1345 | 345/92 |
| 2009/0306536 A1 * | 12/2009 | Ranganathan | A61B 5/01 | 600/549 |
| 2010/0315833 A1 * | 12/2010 | Holman | G02B 6/0028 | 362/607 |
| 2011/0007035 A1 * | 1/2011 | Shai | G06F 3/0338 | 345/179 |
| 2011/0007047 A1 * | 1/2011 | Fujioka | G02F 1/13338 | 345/207 |
| 2011/0105869 A1 * | 5/2011 | Wilson | A61B 5/1459 | 600/323 |
| 2011/0141048 A1 * | 6/2011 | Brosnan | G06F 3/042 | 345/173 |
| 2011/0182085 A1 * | 7/2011 | Ko | F21K 9/00 | 362/612 |
| 2011/0273906 A1 * | 11/2011 | Nichol | G02B 6/0076 | 362/607 |
| 2013/0070074 A1 * | 3/2013 | Won | G01L 1/247 | 348/77 |
| 2013/0155351 A1 * | 6/2013 | Garelli | G02B 6/001 | 349/64 |
| 2013/0155723 A1 * | 6/2013 | Coleman | G02B 6/0018 | 362/621 |
| 2013/0248226 A1 * | 9/2013 | Sime | A61B 5/6804 | 174/251 |
| 2014/0036539 A1 * | 2/2014 | Lee | G02B 6/0011 | 362/613 |
| 2014/0070957 A1 * | 3/2014 | Longinotti-Buitoni | A61B 5/02055 | 340/870.01 |
| 2015/0087948 A1 * | 3/2015 | Bishay | A61B 5/04087 | 600/382 |
| 2015/0087951 A1 * | 3/2015 | Felix | A61B 5/04085 | 600/382 |
| 2015/0094552 A1 * | 4/2015 | Golda | A61B 5/04325 | 600/336 |
| 2015/0109196 A1 * | 4/2015 | Grass | G06F 3/014 | 345/156 |
| 2015/0146144 A1 * | 5/2015 | Yang | G02F 1/133512 | 349/106 |
| 2015/0148691 A1 * | 5/2015 | Moyer | A61B 5/04325 | 600/480 |
| 2016/0038083 A1 * | 2/2016 | Ding | A61B 5/6804 | 600/388 |
| 2016/0345872 A1 * | 12/2016 | Wasson | A61B 5/1451 | |
| 2017/0238854 A1 * | 8/2017 | Henshaw | A61B 5/14521 | |
| 2017/0245796 A1 * | 8/2017 | Zalevsky | A61B 5/6804 | |

\* cited by examiner

FLEXIBLE LIGHT GUIDE FILM FOR ELECTRONIC ACTIVATION AND CONTROL

CROSS REFERENCE TO RELATED APPLICATION

Pursuant to 35 U.S.C. § 119, the benefit of priority from provisional application 62/206,969, with a filing date of Aug. 19, 2015, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to a light guide film (LGF) for powering and controlling electronic circuits. In particular, the invention relates to an LGF that passes optical energy for operation as an optical sensor and directing light to a central processing unit.

Previous research has led to techniques for incorporating light guide film to dynamically control tunable metamaterials in prior patent applications. Light guide film is a flat version of optical fiber in which the optical energy is confined between the two surfaces of the film. Other research has produced flexible electronic circuits that can be worn on the skin as sensors (as suggested by John Rogers from University of Illinois). These circuits are powered and controlled by conductors fabricated from serpentine patterns that flex with the silicone film substrate that holds the circuitry. The circuitry must be limited in sire due to the need for conductors. Also, communication from the foot to a central processing region worn on the arm necessitates a long and robust flexible conductor. Further, the conductors can interfere with electromagnetic radiation such as that emitted by antennae carried by military personnel.

SUMMARY

Conventional circuit control techniques involving conductive wires yield disadvantages addressed by various exemplary embodiments of the present invention. In particular, a light transmission system is provided for operating an optically responsive circuit. The system includes a light guide film (LGF) to transmit light emitted from its edge or internal source, and a scattering node for directing the light to the circuit. The circuit is disposed on a proximate face of the LGF. The scattering node is disposed on a distal face of the LGF opposite the circuit. The circuit can be an integrated circuit, a light detection sensor or a photovoltaic cell. The LGF acts as an optical "printed circuit board" whereas the normal conducting signal paths and power paths are replaced with light.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
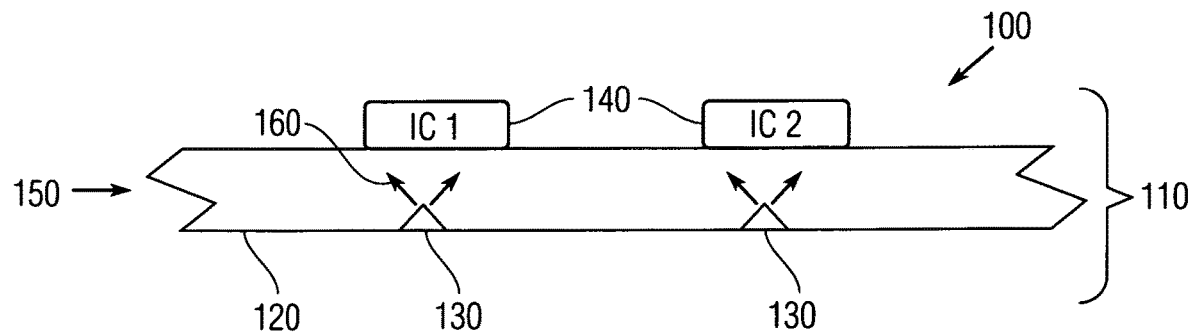
FIG. 1 is an elevation sectional view of an integrated circuit control using light guide film.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a field programmable gate array (FPGA) or other related component.

Optical power is guided to each circuit through light guide film, which can also acts as a substrate for the electronic circuits. Similarly, light guide film can carry optical power and signals from each circuit to other circuits. Methods can be used to direct light to specific circuits in order to power them and/or communicate/control them independently or in groups. For example, optical filters can be used to pass different frequency light to different circuits. Another means is to use multiple layers of light guide film where each layer can pass information through other layers (in a direction approximately perpendicular to the film) in a way that crosstalk between layers does not occur. The light guide film can be rigid or flexible. Communication with individual circuits or groups of circuits could utilize these methods, or by using digital addressing techniques.

Another application would be to both power and control metamaterials. A previous application was to control passive metamaterials, but exemplary embodiments also power active circuitry. The circuitry can be used for very precise control of the metamaterial, and/or to add energy to the metamaterials that can be used to replace energy lost in the electromagnetic radiation the metamaterial was designed to control. Loss is a common issue with metamaterials that operate in the negative index of refraction region or with an index of refraction near zero, or even positive index materials in many cases.

Exemplary embodiments provide reverse light transmission, able to be used to direct light impinging on the surface of the light guide film (LGF) towards a central processing location. For example, silicone, or other flexible LGF can be used as a skin sensor which directs long-wave infrared blackbody radiation from the skin to a central processing unit. The LGF can then detect injury or other complications in a body and report them remotely or by using an optical or radio frequency link. Such would also be the case in the event the LGF becomes damaged, thereby preventing light from reaching the central processing unit. Also, as a sensor, the LGF can be used to direct illumination from the outside for dynamic camouflage, for example. Further, the LGF can be used as a low cost large area sunlight collector directing sunlight to photocell electrical generators localized in a single region (such as at the edge of the LGF).

Light guide film is generally fabricated from a sheet of polymer (or such material) that has a specific index of refraction different from its surroundings. This produces total internal reflection of the light to occur so any light inside the film is confined. The light reflects back and forth from the surface faces in a manner similar to fiber optics. Edges can also be treated to aid confinement of the light to the inside volume of the polymer. Other materials can also be used such as silica or similar glass. Scattering centers or nodes on one or both surfaces of the LGF disrupt the reflection angle to scatter light out of the surface of the LGF near or opposite the scattering center. By controlling the size and density of the scattering center, different amounts of light exits the LGF.

Light guide film (LGF) can be rigid or flexible and is often used for signs, advertising and displays (e.g., FLEx Lighting). One common use for LGF is for visual displays, such as a liquid crystal display (LCD) or a computer monitor. Light is injected into the film near an edge, and scattered out of the LGF over the surface thereby illuminating its proximate face. By controlling the density of the scattering centers, the intensity of the illumination can be made uniform over the entire display instead of being excessively bright near the illumination edge.

Some types of light guide materials include acrylic (e.g., poly methyl methacrylate), polycarbonate or silica. Therefore most light guide films are insulating and make a suitable substrate for electronic circuits. Recent research has already shown that electronics can be fabricated on flexible polymer substrates. In these cases, conductors power the electronics. The conductors can be fabricated in a serpentine way so they also flex with the substrate. Using silicone substrates, the circuits can be made extremely flexible and even wearable on human skin tissue. In various exemplary embodiments, the light guide film can be used to energize a circuit. Thus, no external wires would be necessary, and the circuit could be placed anywhere on the light guide film as long as scattering centers are formed near the circuit. The conversion from light energy to electrical potential could occur by incorporating a photovoltaic component as part of the circuit, or inversely, by incorporating light emitting diodes or lasers to inject light into the LGF.

FIG. 1 shows an elevation view 100 of an integrated circuit control 110 by a light guide film (LGF) 120. Distributed light scattering nodes 130 are disposed on a distal face of the LGF 120, while integrated circuits 140 #1 and #2 are disposed opposite the nodes 130 on a proximate face of the LGF 120. A source of electromagnetic radiation emits optical light 150 to be scattered by the nodes 130 for reflection to the integrated circuits 140, which obtain their power through the light 150. This technique enables activation of the integrated circuits 140 without wires to conduct electric current. The integrated circuits 140 can include photovoltaic cells to convert optical energy to electric current.

In various exemplary embodiments, the LGF 120 could be used to control, or communicate with electrical circuits including circuit components in a periodic or non-periodic array structure, enabling several control-and-communication signals to be injected. For example, optical band-pass filters could be used so that there is a one-to-one correspondence between optical frequency and control function.

Figure 2:
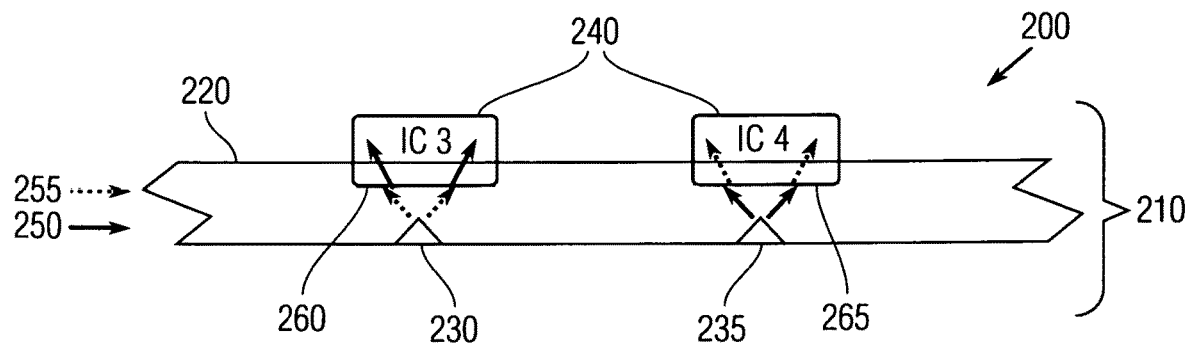
FIG. 2 is an elevation sectional view of an integrated circuit control with band-pass filters.

FIG. 2 shows an elevation view 200 of an integrated circuit control 210 by an LGF 220 with filtering. Distributed nodes 230 and 235 are disposed on a distal face of the LGF 220. Integrated circuits 240 #3 and #4 are disposed opposite the respective nodes 230 and 235 on a proximate face of the LGF 220. Sources of electromagnetic radiation emit optical lights 250 and 250 at separate wavelengths to be scattered by the corresponding nodes 230 and 235 for reflection to the integrated circuits 240. The lights 250 and 255 can be at distinct frequencies selected to pass through respective optical band-pass filters 260 and 265. Such wavelengths can, for example, constitute red (700 nm) and green (550 nm) light. This configuration enables use of several different optical wavelength (or frequency) bandwidths to control several functions in at least two electronic circuits. Each wavelength or frequency transmits through its band-pass filter 260 or 265 so as to control only one function (or a predetermined set of functions).

Another means to generate several control/communication signals is to utilize several layers of light guide film. Light is injected into the film edge (or elsewhere within) that controls or communicates with one particular function, or integrated circuit in the case that many exist. Under proper design, light can pass through several light guide film layers without interference with other layers thereby minimizing crosstalk (e.g., FLEx lighting).

Figure 3:
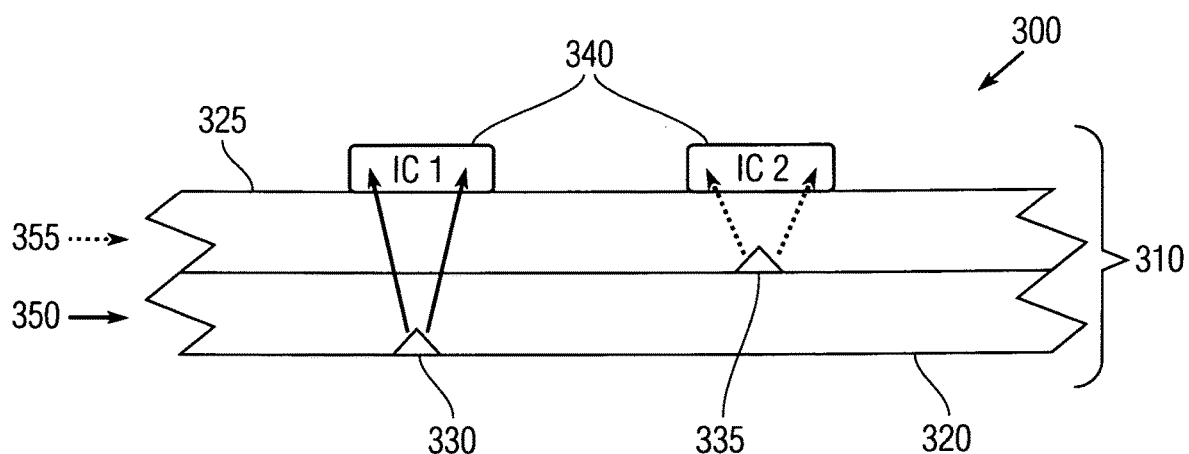
FIG. 3 is an elevation sectional view of a multi-layer integrated circuit control.

FIG. 3 shows an elevation view 300 of an integrated circuit control 310 by multiple light guide film layers 320 and 325. Distributed nodes 330 and 335 are disposed on the exposed face of distal LGF 320. Integrated circuits 340 #1 and #2 are disposed opposite the respective nodes 330 and 335 on the exposed face of proximate LGF 325. A source of electromagnetic radiation emits optical light 350 and 355 through the respective layers of LGF 320 and 325. The light 350 and 355 scatters by the corresponding nodes 330 and 335 respectively disposed on exposed and internal distal faces of their corresponding layers for reflection to their associated integrated circuits 340. This constitutes a configuration whereby several light guide film layers can be used to control functions on two or more independent electronic circuits.

In either case, single light guide film 120 can serve both to power the integrated circuit 140, as well as control or communicate with that integrated circuit 140, or group of such circuits. Scattering centers can be formed on the micro- or nano-scale such that many individual functions can be controlled in an integrated circuit 140, or on a macro-scale to achieve enough optical intensity to power a circuit. As an example, a frequency system could be used where one frequency is used to power all electronics, and the other frequency for control.

Control and communication with circuits, individually or in groups, can be accomplished digitally by sending address information so that only the intended integrated circuits 140 anticipate follow-on data packets, for example. Similarly, the same mechanism can be used so that each integrated circuit 140 having a unique address can communicate back to a central processor. In exemplary embodiments, the light guide film 120 can be used to control the values of light tunable circuit components. This changes the characteristics of the integrated circuit 140 and serves to act as a parameter control line, a fine-tuning mechanism, or a switch.

In various exemplary embodiments, the light guide film 140 can be used in reverse. Under such circumstances, sensors formed on the surface can communicate with a remote central processing unit. In this aspect, many sensors can communicate with a single processing unit without the need for long electrically conductive wires or fiber optic cables. For flexible applications, such as a multi-sensor worn on the skin, optical communication would be more robust than obtainable with conductive connections. This is because long wires can break, causing an incomplete circuit for a conventional configuration. Interference represents another conventional vulnerability from extraneous electromagnetic radiation. Similarly, LGF can be applied to the skins of other platforms such as aircraft wings, automobile windshields, etc.

As a sensor exemplary embodiment, skin produces blackbody radiation according to body temperature. When an area of the skin becomes agitated or injured, the temperature often rises. This change in blackbody radiation can be detected by an LGF-equipped sensor and directed to a central processing unit (CPU). A marine or soldier could use such a system as an automated method of communicating an injury to a medical team should the marine or soldier become incapacitated. Such a system could be worn as a patch, or as an inherent part of clothing as an inside liner. Other types of sensors might include heart pulse detection, heart rate monitoring, oxygen sensors, etc.

Figure 4:
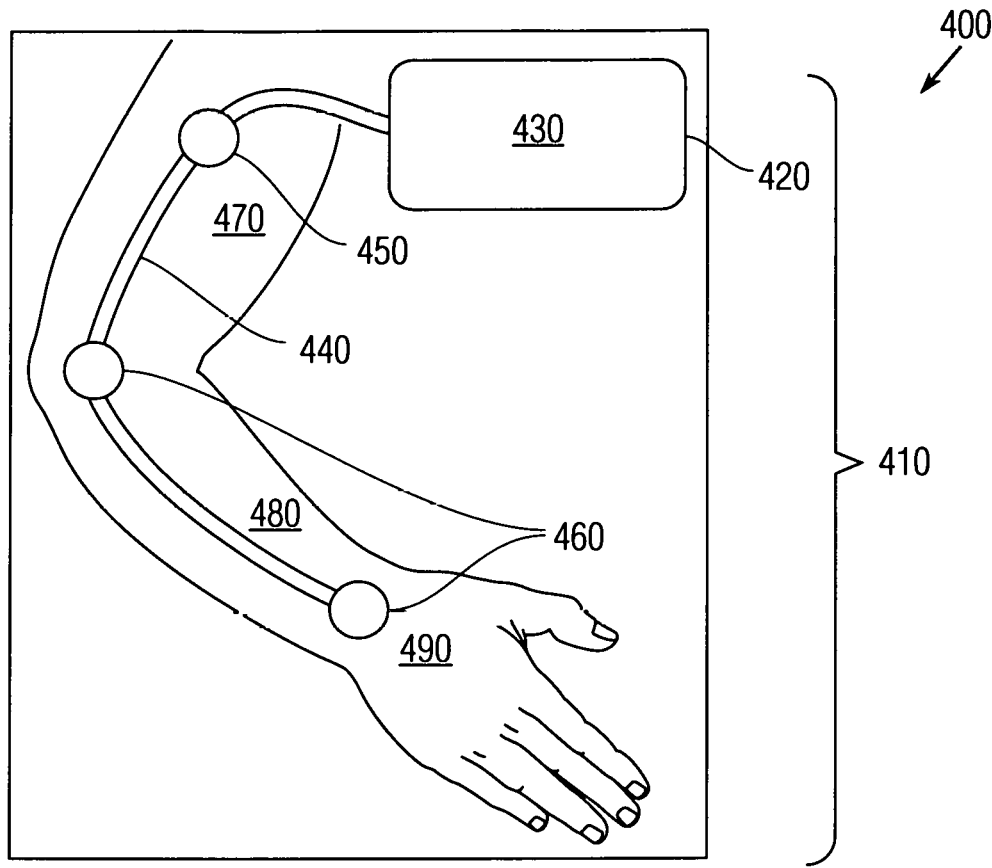
FIG. 4 is a diagramic view of a human sensor system using light guide film.

FIG. 4 shows e representational viewer 400 of a modular sensor system 410 for exemplary medical surveillance and communication. The system 410 communicates via an optically controlled metamaterial antenna 420 for communication with a central processing unit (CPU) 430. A light guide film (LGF) 440 connects the CPU 430 to sensors 450 and a radio frequency identification device (RFID) 460. The LGF 440, along with the sensors 450, can be attached to the skin of the upper arm 470, the forearm 480 and/or the hand 490. This constitutes an example where the LGF 440 communicates the output of a sensor 450 (in this case, skin temperature) to the CPU 430 and antenna 420 for wireless communication.

Another application of the reverse method is to concentrate light as a two-dimensional array of micro-lenses to guide the light towards a photovoltaic cell. This would produce much cheaper solar energy devices because the necessary photovoltaic device would be considerably smaller in area than available conventionally. An example use of this is a flexible sensor system 410 in which a marine or soldier might unroll the flexible light guide film 440 to collect light and charge batteries in the field. The system could be light-weight and low cost and presents an efficacious manner to collect light on overcast days without the need for large photovoltaic arrays, for example. Another utility benefits satellites so the large arrays of solar panels could be replaced with light guide film drapery for directing energy to a single focal location where the photovoltaic is concentrated. Thus, large quantities of optical power can be generated even on overcast days.

Figure 5:
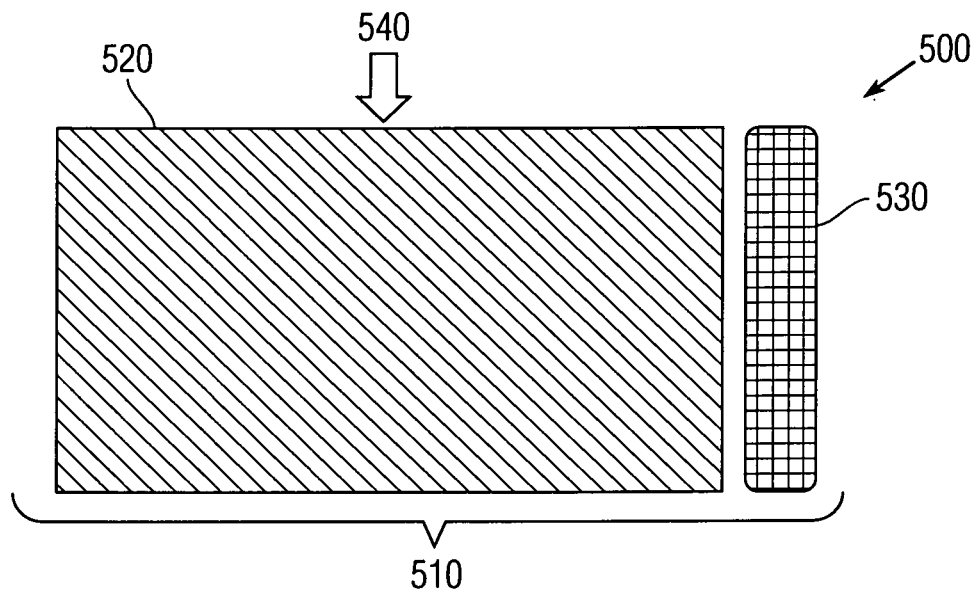
FIG. 5 is an elevation sectional view of a charging system with photovoltaic cell using light guide film.

FIG. 5 shows an elevation cross-section view 500 of a solar radiation concentrator 510 for concentrating light at low ambient levels. The concentrator 510 includes a light guide film (LGF) 520 and a solar cell 530 along an edge of the LGF 520. Incident solar radiation 540 strikes the LGF 520 for redirection to and absorption by the solar cell 530 for conversion into electrical energy. An example where the light guide film is used to concentrate light for low cost solar energy applications.

The application of light guide film directing light into a photovoltaic enables flexibility in satellite design such as moving solar cells to a secure protected location away from debris and radiation and the ability to direct light into areas blocked from the sun. The same applies for a marine or soldier to relocate recharging a device battery to a secure, environmentally protected, or dark location. Light guide films can also be disposed on windows and to direct light to power electronic devices on the walls. Another utility would be as a removable window screen to diffuse light incident on the window. The removable diffusing window screen is convenient compared to conventional light diffusing window.

The exemplary LGF operated circuits employ light to control and power electronic components, e.g., processors, sensors, etc. at much higher speeds than available for electric current. These embodiments would parallel process over large areas at near the speed of light, and without other electromagnetic interference such as from radio frequencies or mechanical vibration. The exemplary embodiments can be used for electronics, sensing, and can serve is a broad number of electronic applications, including operation for simultaneous triggering of multiple high-voltage switches or wearable electronics.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A wearable sensor device for optically responding to electromagnetic emission, said device being disposable on a body surface and comprising:
    a flexible light guide film (LGF) substrate having proximate and distal faces joined along an edge for receiving the emission to pass between said proximate and distal faces;
    an optically responsive switch disposed on said proximate face of said LGF substrate, said switch toggling upon receipt of the emission; and
    a scattering node disposed on said distal face of said LGF substrate opposite said switch for redirecting the emission to said switch.

2. The device according to claim 1, wherein said switch toggles at least one of electrical power and control responsive to the emission.

3. The device according to claim 1, wherein said LGF substrate includes first and second LGF layers, each layer having a corresponding scattering node for toggling a corresponding switch.

4. The device according to claim 1, wherein said LGF substrate includes a band-pass filter at said proximate face for restricting the emission to a select wavelength band.

5. The device according to claim 1, wherein said distal face is disposed on the body surface.

6. The device according to claim 5, wherein said LGF substrate receives the emission corresponding to infrared radiation from the body surface.

7. The device according to claim 1, wherein said switch on said proximate face comprises a plurality of switches with corresponding nodes at said distal face.

\* \* \* \* \*